United States Patent [19]

Burrell

[11] 4,116,605
[45] Sep. 26, 1978

[54] APPARATUS FOR PRODUCING RETREADING ENVELOPES

[76] Inventor: John R. Burrell, 202 King Rd., Chalfont, Pa. 18914

[21] Appl. No.: 718,792

[22] Filed: Aug. 30, 1976

Related U.S. Application Data

[62] Division of Ser. No. 680,273, Apr. 26, 1976, abandoned.

[51] Int. Cl.² ............................................. B29D 23/04
[52] U.S. Cl. .................................... 425/466; 264/209; 425/381; 425/467
[58] Field of Search ............. 264/209, 177 R; 72/264; 425/380, 381, 466, 467, DIG. 53, 465, 532

[56] References Cited

U.S. PATENT DOCUMENTS

| | | | |
|---|---|---|---|
| 1,504,653 | 8/1924 | Taylor | 425/467 UX |
| 3,229,006 | 1/1966 | Nohl | 264/209 X |
| 3,281,896 | 11/1966 | Meyer et al. | 425/466 |
| 3,309,443 | 3/1967 | Scott, Jr. et al. | 425/532 X |
| 3,608,137 | 9/1971 | Wilson | 425/465 |

FOREIGN PATENT DOCUMENTS 1,371,334 10/1974 United Kingdom ............... 425/380

Primary Examiner—Francis S. Husar
Assistant Examiner—Mark Rosenbaum
Attorney, Agent, or Firm—Joseph W. Molasky

[57] ABSTRACT

This invention relates to an improvement in the construction of retreading envelopes and to an extrusion apparatus for producing same.

The envelopes commonly used in bonding new treads to tire casings are generally uniform in thickness, and, as a result, no provision is made for those areas of the envelope which receive the greatest stress.

By utilizing an envelope of U-shaped cross section and one whose thickness is significantly increased in areas of greatest stress, the prior art impediments are effectively overcome.

7 Claims, 9 Drawing Figures

APPARATUS FOR PRODUCING RETREADING ENVELOPES

This is a division of application Ser. No. 680,273, filed Apr. 26, 1976, now abandoned.

This invention relates to an improved apparatus for the manufacture of a retreading envelope.

BACKGROUND

In general, most new tires are made by wrapping a layer of uncured tread rubber around an uncured tire casing and placing the combination in a tire mold where it is subjected to increased temperature and pressure. The result is a "cured" tire in which both the tread and casing are cured simultaneously. This process is effective in making tires because the tread and casing are cured together and only once. However, when these conditions are applied to the retreading of an already cured casing the process does not work nearly as well. The reason for this lies in the properties of oncecured rubber; for while the new tread is being "cured" for the first time, the previously cured casing is being subjected to a re-curing operation. The result is an over-cured casing whose fibers are severly weakened.

To avoid this problem a second method of recapping tires was developed. According to this method a pre-cured tire tread is wrapped around a precured casing and both elements are bonded together by a "cold" vulcanization process.

In a preferred aspect of this method, an uncured cushion stock of rubber is applied to the casing to secure the tread strip and this combination is encased in an elastic and fluid impervious envelope. The encased tire is then mounted on a rim, inflated to its normal dimensions and placed in a pressure chamber where bonding is effected at temperatures below 212° F.

Generally, an outlet valve is provided in the envelope so that entrapped air and moisture from between the tread strip and tire casing can escape to the atmosphere and thus assure a tight cure.

The advantages of using an envelope of this type are several.

First, there is little or no danger of deforming the tire, as is the case when a rigid sealing means is used. And secondly, the elastic envelope will assure retention of the tread material to the tire body during the vulcanization process.

Unfortunately, however, elastic retreading envelopes have a limited life. Although they can be reused so long as they remain intact; nevertheless, and in practice, it commonly occurs that the pulling on and securing of the envelope over the tire carcass, and its subsequent removal, weaken the envelope severely and it develops leaks and eventually fails. Thus, in retreading processes, the integrity of the envelope is constantly being tested and once it is punctured its effectiveness is destroyed because it can no longer maintain the vacuum which is needed to maintain an effective seal.

THE INVENTION

It is an object of this invention to provide an apparatus for producing a retreading envelope which can establish a fluid impervious seal around the whole tire during the recapping operation.

An additional object is to provide an apparatus for producing an envelope of such durability that it can be reused repeatedly and, thus, achieve economies which will exceed those which are possible with presently available envelopes.

A further object is to provide an apparatus for producing an envelope wherein the sealing means is improved due to the manner in which the entrapped air beneath the envelope is released to the atmosphere.

The instant envelope is used in the "cold-vulcanization" process commonly used for recapping previously-cured tires.

Accordingly, and in practice, the tire to be recapped is mounted, inflated to normal size and then buffed along its tread zone to prepare the surface for the new tread material. By "tread zone" is meant that area which served originally as the situs for the original tread.

Thereupon, the following known procedure is employed:

(a) cured tread material is superimposed upon the tread zone of the previously-cured tire casing, (b) a bonding agent is interposed between the tread material and tire casing to provide a means for securing the new tread to the tread-zone. The bonding agent may be gum adhesive or a rubber composition which cures at a temperature in the range of from about 95° to 100° C., but preferably, at about 95° C.

(c) the tire casing, the new tread material and the bonding agent are then enclosed within a flexible envelope to provide a means for holding and securing the tread material to the tread-zone; the envelope is of U-shaped cross section and fits snugly over the sidewalls of said casing;

(d) the tire casing and envelope, thus assembled, are then mounted onto a rim equipped with means for sealing the sides of the envelope to the shoulders of the tire casing and to said rim;

(e) the said casing is inflated to a pressure sufficient to hold the casing in its normal operating shape, and then placed in a curing chamber; as the temperature and pressure are raised in the curing chamber the air between the envelope and the tire casing is expelled through a valve in the envelope and ultimately through a hose attached to the outside of the curing chamber; thus causing the envelope to bind more tightly around the casing and tread;

(f) the temperature is maintained at a curing range temperature of from about 95° to 100° C. to effect a bonding of the tread material to the tire casing.

Another feature of this invention lies in the apparatus by which this envelope is manufactured. By utilizing my new biased core extruding device an envelope can be produced with predetermined thickness along any given portion of its U-shaped cross section.

The precise means for accomplishing this result will be described with greater particularity in the description of The Preferred Embodiments.

THE DRAWINGS

THE PREFERRED EMBODIMENTS

Figure 1:
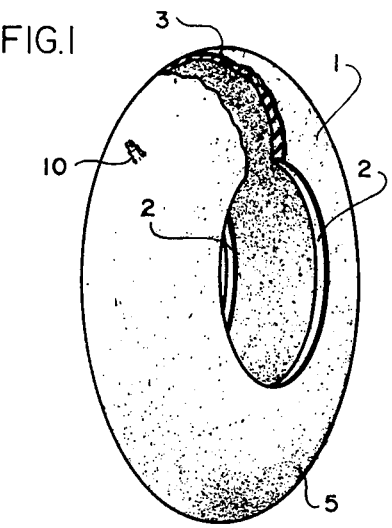
FIG. 1 is a diagrammatic view of the instant envelope with a section broken away.
Figure 2:
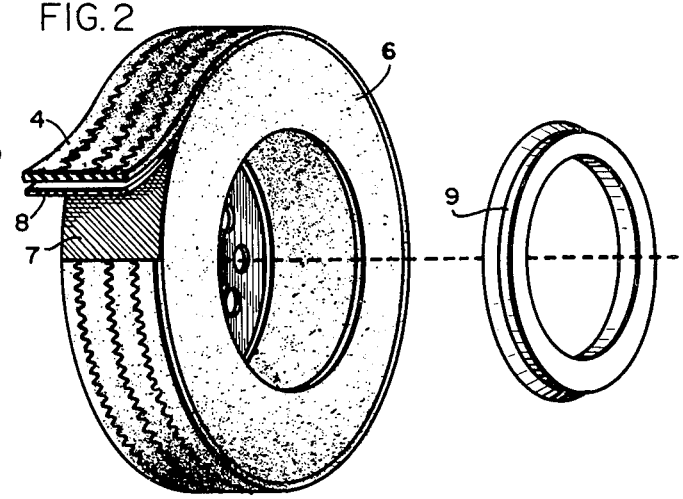
FIG. 2 is a perspective view of a tire assembly and sealing ring.

FIG. 1 shows the envelope 1 of this invention prior to its assembly on a tire. This envelope is annular in construction and has a generally U-shaped cross section. In addition, it has a hole through its circumferential middle as defined by inner edges 2. This envelope 1 is characterized by a thicker sidewall surface which affords longer life due to its resistance to tearing and stretching during use and removal. The inner peripheral surface of the envelope, that is, the surface facing onto the tread strip, is hereinafter referred to as tread face 3. The object of tread face 3 is to provide a more flexible zone of sufficient strength so as to allow it to be drawn down and into the grooves in the tread, thus providing a tighter bond and more complete evacuation of air during the curing cycle.

It is possible to use overlying layers of the same or different material to reenforce the tread face in conventional envelopes, but such a construction has many disadvantages. In addition to the expense and additional steps required to secure one or more layers to another, said layers have a tendency to expand and contract at different temperatures and pressures and this results in a shirring effect which eventually causes the layers to separate.

Referring again to FIG. 1, the breakaway portion shows that the greatest concentration of material within the envelope is located along its sidewall, that is, along the face which is subjected to extensive pulling and stretching as it is placed upon the combination of tire carcass and tread strip.

Figure 4:
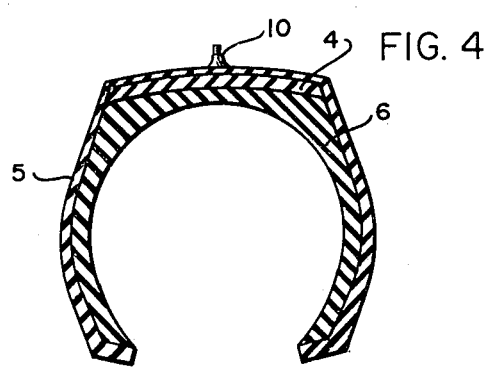
FIG. 4 is a transverse sectional view of a portion of the assembled elements depicted in FIG. 3.

FIG. 4 illustrates a sectional view of envelope 1 assembled onto a tire carcass 6. As illustrated, the tread face comprises essentially that area of envelope 1 which covers the tread strip 4. In general, the said tread face has a thickness of from about 0.070 to 0.079 inches and, preferably, 0.075 inches. Upon covering tread strip 4 the lateral sidewalls 5 of envelope 1 assume a gradually increasing thickness which terminates at inner edges 2. The lateral sidewalls 5 are generally of somewhat thicker dimension than that of conventional envelopes so as to provide for longer life of the envelope. In general, the said sidewalls have a thickness of from about 0.080 to 0.090 inches and, preferably, 0.085 inches. A bead along inner edges 2 provides an anti-tear barrier which protects the envelope during installation and removal so as to prevent a splitting of the envelope when it is being stretched.

Another unique feature consists in means for evacuating the residual air and other gaseous fluids which may be entrapped between tread strip 4 and tread face 3 of the envelope. This evacuating is necessary to provide an ideal environment of the curing of the cushion stock and permits equal pressure throughout the area being cured.

The envelope is constructed of rubber or other synthetic material such as plastic but, preferably, rubber.

This invention will now be described by reference to the Figures and a specific example.

A tire carcass 6 is prepared for recapping by buffing the outer surface of the casing 7 to remove the old tread. A pre-cured rubber tread strip 4 is then wrapped around the tire with a thin layer of uncured rubber cushion 8 between thread strip 4 and the casing surface 7. If bonding cement is used it may be applied to either the inner surface of the tread strip or to the surface of the tire casing 7 or, alternatively, it may be applied to both the tread strip and tire casing.

Figure 3:
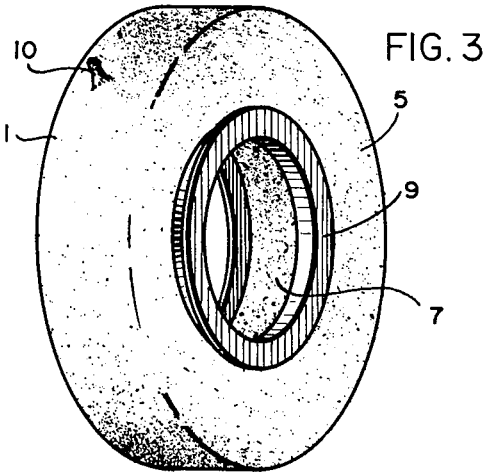
FIG. 3 is a perspective view of the elements of FIGS. 1 and 2 fully assembled.

The assembly, consisting of tire casing, thread strip and bonding agent, is then enclosed within the flexible envelope 1 (FIG. 1). The said envelope is then fitted around the tire so that its lateral sidewalls 5 extend inwardly around and over the sidewalls of the tire which is to be retreaded (FIG. 3).

The entire assembly of tire, bonding agent, tread strip and envelope is then mounted onto a suitable rim. The said rim includes flanges and a sealing ring 9 by which to contain the lateral sidewalls 5 of the envelope so as to place it in sealing engagement with the sidewalls of the tire which is to be retreaded. Air which is trapped between the envelope 1 and the tire is vented through the center line exhaust valve 10 into the atmosphere.

This center line exhaust valve represents a significant improvement over known means of evacuating air and other gases from retreading envelopes. Its superiority is due largely to its central position along the circumferential center of the envelope. As shown in FIGS. 1, 3 and 4 the said valve is positioned equidistant between the edges of tread strip 4 and, as a result, it is in the best possible position to provide a complete evacuation of residual fluids. The ability of this valve to effect a complete evacuation of entrapped gases is also due to the fact that the circumferential center of the envelope is the last to collapse when the assembly is subjected to pressure in the autoclave. Consequently, the circumferential center of the envelope forms a natural channel for the air and other gases to be evacuated through said valve and, when it eventually collapses, it assures the best possible seal between envelope, tread strip, bonding agent and tire casing. Obviously, such a seal also results in a more secure bond between the tread and tire casing.

The combined envelope, tire casing, bonding agent and tire tread are then placed into the suitable autoclave or pressure chamber which is provided with a suitable outlet means for communicating with the outside atmosphere. The tire to be retreaded may either be inflated prior to its introduction into the autoclave or, alternatively, it may be placed into the said autoclave and then inflated.

The autoclave is pressurized to approximately 130 pounds per square inch. The resulting pressure upon the envelope 1, tread strip 4 and tire casing 6 forces these elements into a close bonding condition. The tread strip is pressed against the tire casing, and, the tire casing, in turn, is pressed outwardly against the tread strip. This high cumulative pressure is maintained for a sufficient time to insure the bonding of said tread strip to the tire casing. During this operation any air or gas which is entrapped between the envelope 1 and tread strip 4 is forced out of the envelope through its depressions and, ultimately, through exhaust valve 10.

Steam or heated air under pressure is introduced into the autoclave and the temperature within said autoclave is raised to between 200° and 300° F., depending on the process being employed, but, preferably, to about 212° F., during the bonding operation.

Thereafter, the autoclave is opened and the retreaded tire is taken out and permitted to come to room temperature.

Another aspect of this invention lies in the apparatus which is used to manufacture the instant envelope.

This apparatus consists of an extrusion device with a ring shaped core or nozzle. The raw material, generally rubber, is fed to this device through an annular chamber which eventually terminates in a toroidal space bounded on the one side by the internal surface of the centrally positioned core and on the other side by the internal surface of the extruded body. The discharge end of the core is bounded by an annular die and, in conjunction therewith, it essentially determines the thickness of the extruded envelope.

Since a feature of the apparatus of this invention is that it can produce an envelope of non-uniform cross section, it is essential that there be a non-uniform feeding of the raw material through the toroidal chamber. This non-uniformity is achieved by a cambered curvature which covers a portion of the core. This protuberance deflects a portion of the raw material as it proceeds along its path between the extruder body and core and thus accounts for the non-uniform cross section of the resulting envelope.

Figure 7:
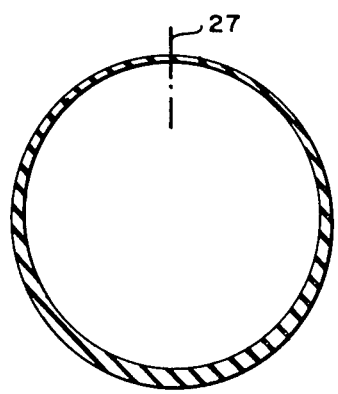
FIG. 7 is a transverse sectional view of extruded material as it emerges from the apparatus of FIG. 5.

In the instant version of the extruding process, which I refer to herein as method A, the rubber emerges from the extruder with a variable thickness which is approximately one eighth of an inch at its 6 o'clock position and slightly greater than one sixteenth of an inch at its 12 o'clock position (as viewed in FIG. 7). At the 12 o'clock position it is automatically cut at point 27 (FIG. 7) as it emerges from the extruder. The resulting thickened U-shaped tube is then raised up over a wooden or aluminum stretching wheel which measures 45 inches in diameter and two inches in thickness with a radius of about one inch around the entire periphery of the wheel.

The wheel is motor driven by a variable speed device which allows it to run very slowly as the rubber is emitted from the extruder and placed onto the wheel. As the rubber is taken over the top of the wheel (which is approximately 2 feet above the extruder) the rubber is grasped by the wheel and stretched in such manner that the thickest (i.e., top) part thereof is stretched down to a thickness of 0.085 inches this occurs as the bag is stretched around the wheel in a circular motion. In practice, the bottom end of the skirt is not involved in the stretching process so that, ultimately, there is a thinner section of rubber around the top of the wheel and a slightly thicker section at the edge of the skirt.

The stretched rubber is allowed to accumulate on the wheel until approximately five or six bags have been built; then the extruder is turned off, the wheel is stopped, the rubber is cut and cooled and it is then peeled off the said wheel and coiled onto a flat table in circular form. Thereafter, the rubber is inspected and positioned to afford the desired diameter so as to accommodate the curing mold. A splice is made using a skiving machine, so that the bag can be placed into the mold.

Next, a curing ring is placed in the center of the bag so that it can become an air container and allow air to be blown into it during the curing process. The entire unit, that is, the bag plus the curing ring, are then placed in the mold and said mold is closed and the bag inflated to approximately 100 pounds of pressure. This assembly is then allowed to cure for about 15 minutes. After curing, the curing ring is removed and the center of the bag is die cut with a clicking machine to afford the desired diameter at the center hole.

A second modification of the stretching wheel, which I shall refer to as wheel 2, is designed with the same diameter of 45 inches and the same cross section of 2 inches with a radius of 1 inch at the outer circumference, but instead of being a single wheel, it is in the shape of a continuous wheel similar to a thread on a bolt. The depth of the wheel is sufficient to provide an ample area for the rubber to be stretched down completely over its sides. In addition, it is long enough in width to accommodate seven to eight bags before it is full. Under this variation the bag or rubber is never on top of itself and always has direct contact with the wheel and any given portion of the rubber. The advantage of this is that the rubber can be water cooled and set in its desired shape much quicker. An additional advantage is that several wheels can be employed and can be moved in front of the extruder and changes more quickly, thus, allowing for a more highly automated production process.

Figure 8:
FIG. 8 is a transverse sectional view of optionally extruded material for use in making the instant envelope.

An alternative method, method B, consists of an extruder so designed as to provide a horizontal-shaped sheet of rubber (FIG. 8) that is essentially the same shape as that of FIG. 7 but thicker in the middle and thinner at the extreme ends. In this process, the sheets of rubber are conveyed slightly further away from the extruder and then fabricated on the same type of stretching wheel as described in the preceding paragraph to build a similar type bag.

Figure 9:
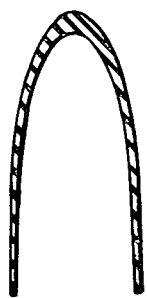
FIG. 9 is a transverse sectional view of a rubber material which is utilizable in making the instant envelope, extracted from a U-shaped die.

Alternative method C comprises a U-shaped die and core which allows the rubber to go immediately onto the stretching wheel without the immediate handling problems which are posed by circular shaped or flat shaped dies. An illustration of an envelope thus produced is shown in FIG. 9.

Figure 5:
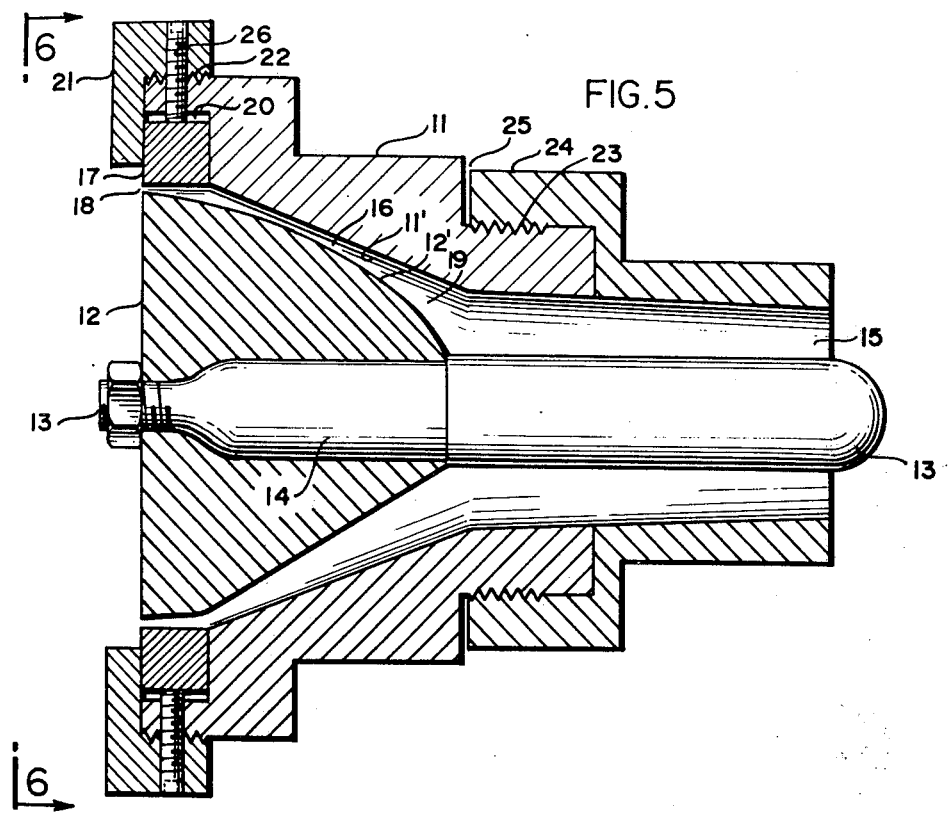
FIG. 5 is a cross sectional side view of the apparatus of this invention.

FIG. 5 is a fragmentary sectional view of the device of this invention and it will now be discussed in detail by making reference thereto.

A spider 13 is disposed along axis X—X of the extruder body 11 and the spider, in turn, is connected to core 12 by threaded rod 14.

The raw material is fed into the apparatus by an inlet tube (not shown) which connects to annular chamber 15. The raw material then passes from chamber 15 into the toroidal chamber 16 bounded by internal surface 11' of the extruder body 11 and external surface 12' of the core 12.

The die 17 can be made to move at right angles with respect to the axis X—X by means of four adjusting screws one of which is depicted and referred to in FIG. 5 as stem 26. The play space 20 defines the area through which the said die can be moved so as to adjust the dimensions of the annular discharge opening 18.

By turning the adjusting screws 26 in a clockwise direction the die 17 is adjusted accordingly and is secured in the desired position. This operation determines the cross section of the extruded envelope.

This ability to regulate the size of discharge opening 18, operates in conjunction with the cambered curvature 19 on core 12 to produce an envelope of extruded cross section which is characterized by a greater concentration of material along its circumferential middle (which ultimately serves as the tread zone).

Following this operation the stock is then placed on the stretching wheel and the center or heavier portion is stretched around the circumference of the wheel so as to shape it to the desired form of the retread envelope. This shaping occurs in approximately 90° of travel around said wheel. The external edges of the extruded stock become the inner limits of the envelope and are not stretched at all.

The ability to finely regulate the flow of material through opening 18 also has other advantages. For one, this fine control of material makes it feasible to produce an envelope of greater density than is possible with the calendered stock which is presently used in the manufacture of retread envelopes. Also, this fine control results in an envelope which is surprisingly free of blisters and air traps.

A surprising aspect of my extrusion device resides in the discovery that only by utilizing a core which possesses a partially deformed or curved surface (cambered curvature 12'), instead of the tapered-core commonly used in extrusion devices, is it possible to attain the necessary cross section needed to build the envelope. FIG. 5 illustrates the normal angle of a tapered-core which I have used in a comparison with my 'cambered-core' extruder. Whereas the tapered-core failed to provide an envelope of the desired thickness the 'cambered-core' 12 of this invention produced a consistently high quality envelope with the desired dimensions along both the tread face 3 and lateral sidewalls 5.

The reason for having a thicker concentration of rubber along the peripheral center of the envelopes is to provide sufficient material for the stretching of the bag from a slightly curved shape (as it comes out of the extruder) to one which is flat, highly stretched and cylindrical. In this retread envelope the ratio of the outer circumference to the inner circumference is approximately four to one and, therefore, it is essential that no stretching occur at the inner skirt or inner extreme of the bag. Therefore, in essence, there is approximately four times as much rubber at the tread face area of the envelope as there is at the sidewall openings and this disparity is needed to allow for the stretching which occurs along the face of the envelope on the stretching wheel.

The precise curvature of core 12 is a critical aspect of this invention and any departure therefrom will result in a significant variation from the limitations which I have imposed upon my envelope.

Figure 6:
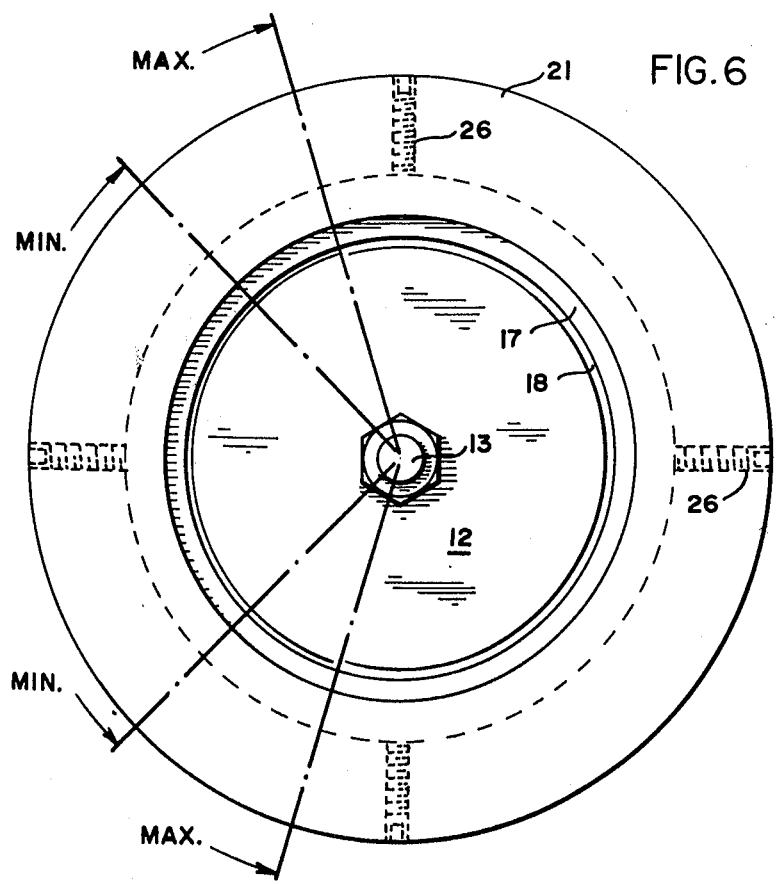
FIG. 6 is a top view of the core angles applicable to the extrusion device of this invention.

FIG. 6 illustrates the angle of curvature from core 12 which I have found to be most suitable for obtaining an envelope which meets the specifications of this invention. In general, this curvature comprises about 90°-146° of the normal angle of the tapered core as shown by the broken line in FIG. 5. In a preferred aspect of this invention I prefer to use a core in which the curvature comprises an angle of about 110° from the norm.

I have described this invention with particularity and with reference to a specific example but it is to be understood that functionally equivalent materials and obvious modifications in construction can be made to this invention without departing from the scope and spirit thereof. Insofar as any such substitutions and modifications are within the purview of the artisan to perform, those changes are considered as being within the scope of this invention.

I claim:

1. In an apparatus for producing an improved retreading envelope for tires,
    an extrusion device having a die and a core positioned within said die and cooperating therewith to define an annular extrusion orifice which essentially determines the thickness of the extruded envelope,
    a body portion of said die cooperating with said core to define a toroidal chamber adjacent to said orifice, said chamber being bounded by an internal surface of the body portion and by an exterior surface of the core,
    and means defining an annular chamber adjacent to and communicating with said toroidal chamber through which natural or synthetic material fed to said extrusion device is passed as it flows to said toroidal chamber,
    the improvement comprising the provision of said core having a shape which has a generally symmetrically tapered shape on one portion thereof and a cambered curvature throughout another portion thereof, said portions circumferentially forming said exterior surface of said core, said cambered curvature providing a partially deformed core configuration to result in an extruder envelope of high density characterized by a high concentration of material along its tread face and gradually diminishing sidewall thickness.

2. The apparatus of claim 1 wherein said die comprises an annular ring mounted on said die for movement relative to said core in a direction transverse to the longitudinal axis of said core and to the direction of flow of material through said extrusion device, and including means operatively associated with said ring for moving said annular ring through said transverse movement to set said annular ring in a desired position relative to said core.

3. The apparatus of claim 2 wherein said means for moving said annular ring comprises a plurality of screw members spaced circumferentially around and extending radially of said annular ring.

4. The apparatus of claim 1 wherein said cambered curvature has a circumferential extent around said core of about 90°-146°.

5. The apparatus of claim 4 wherein the circumferential extent of said cambered curvature is about 110°.

6. The apparatus of claim 1 wherein the core and die are constructed and arranged so that the extruded material is emitted in the shape of a U-tube and can be stretched down to a thickness no greater than 0.085 inch.

7. The apparatus of claim 6 in which the material emitted from the extruder has a thickened portion of approximately one eighth of an inch and is approximately one sixteenth of an inch at its thinnest.

* * * * *